United States Patent Office 3,153,995
Patented Oct. 27, 1964

3,153,995
PHOTOGRAPHIC CAMERA
Hermann Bretthauer, Stockheim, near Braunschweig, and Joachim Mädge, Braunschweig, Germany, assignors to Rollei-Werke Franke & Heidecke, Braunschweig, Germany, a firm of Germany
Filed Sept. 21, 1962, Ser. No. 225,254
Claims priority, application Germany, Sept. 26, 1961, F 35,003
7 Claims. (Cl. 95—11)

This invention relates to a photographic camera, and more particularly to a viewfinder for a camera.

An object of the invention is a provision of a generally improved and more satisfactory viewfinder construction for a camera.

Another object is the provision of an improved and more satisfactory collapsible viewfinder, so designed that when collapsed it does not appreciably increase the external dimensions of the camera.

Still another object is the provision of a photographic camera equipped with a so-called Newton type of viewfinder, sometimes called a viewfinder of the inverted Galileo system, so designed as to be easily collapsible for the sake of compactness when not in use, easily erectable for quick use, and of neat and unobjectionable appearance both when collapsed and when erected.

A further object is the provision of a camera with a collapsible viewfinder of the Newton type, so designed that when collapsed, one of the lenses of the finder is protected by being within the camera body and the other lens of the finder is protected by a cover placed over it.

A still further object is the provision of an improved collapsible viewfinder structure in which a portion of the viewfinder structure, when collapsed, serves also as a protective covering for the main picture-taking lens of the camera.

These and other desirable objects may be attained in the manner disclosed as an illustrative embodiment of the invention in the following description and in the accompanying drawings forming a part hereof, in which.

Figure 1:
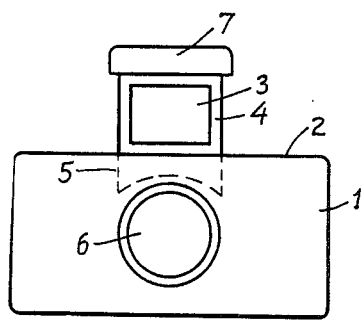
FIG. 1 is a somewhat schematic front face view of one shape of camera equipped with a collapsible finder according to one embodiment of the present invention, showing the finder in erect position ready for use.

Viewfinders of the Newton type as heretofore conventionally used, have customarily been formed in a cylindrical or prismatic or pyramidal tube either protruding externally from one side wall of the camera, or enclosed within a side wall. When the viewfinder tube has protruded from the side wall, this has resulted in a camera of somewhat irregular shape, rather than one having the desirable smooth external contours. When the viewfinder tube has been enclosed within the walls, this has necessarily made the camera body somewhat larger than would otherwise be the case. If the viewfinder has been collapsible, this again has been at the expense of external projections even when collapsed, preventing the desirable smooth external contour. The words "side wall" as applied to a camera in the present application, mean any wall extending from the front to the back of the camera; that is, any wall connecting the front wall to the rear wall of the camera, regardless of whether such connecting wall be arranged vertically or horizontally when the camera is held in normal use. In other words, walls which would frequently be called the top and bottom walls of the camera body are nevertheless included within the broad term "side walls" as herein used.

It has been found, according to the present invention, that although space within a camera body near the rear thereof is usually at a premium, there is nevertheless some free space near the front of the camera body. This is because the cone of light rays entering through the picture-taking lens has a relatively small cross section near the front of the camera, but a much larger cross section near the rear of the camera, where the cone of rays fills the focal plane area. Hence, if the camera body is in the shape of a rectangular parallelepiped (like a conventional "box" camera) it can be seen that there will be some free space available at the front of the body, to a substantially greater extent than the free space, if any, at the rear. Therefore, according to the present invention, the front lens or front mount of the viewfinder is arranged to be pushed into the camera body in the front portion thereof, by motion in a direction perpendicular to the optical axis, and this can be done without increasing the dimensions of the camera body because of the available space near the front of the body, as above stated.

The rear lens or rear mount of the camera, according to the present invention, is pivoted or hinged to the rear portion of the side wall of the body, and according to a further development or feature of the invention, this rear lens or mount of the finder, when collapsed, is preferably covered by a cover which is attached to the front lens or mount, thereby not only protecting the rear lens or mount, but also giving the camera a more smooth appearance when the finder is in its collapsed condition. With such an arrangement, the cover needs to cover only the mount of the rear lens or eyepiece lens of the finder, since the front lens of the finder is out of the way by being pushed into a slot in the camera body, and thus the cover can be relatively shallow, so that in its collapsed position it adds only an unimportant and quite acceptable increase in the height of the camera.

According to still another aspect or feature of the invention, the cover of the viewfinder is made of approximately the same area as that of the side wall of the camera on which the finder is mounted, so that when the cover is collapsed, it gives the appearance of an integral part of the camera body, rather than a protuberance or projection therefrom, and does not destroy the smooth external general contour of the camera. This last-mentioned feature of the invention can be used most conveniently when the finder is mounted on a relatively narrow side wall of the camera, rather than a wide wall.

Figure 2:
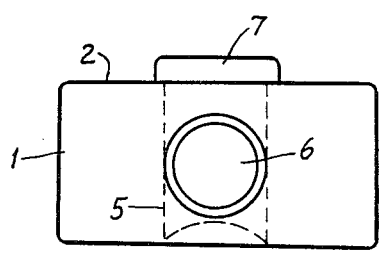
FIG. 2 is a similar view showing the finder in collapsed position.

Referring now to FIGS. 1 and 2, these views show somewhat schematically a camera having a body 1 with a relatively wide top wall 2 on which the finder is to be mounted. The front lens 3 of the finder is in a frame 4 which is formed as part of a slide 5 sliding in a direction perpendicular to the optical axis of the picture taking lens 6, in a suitable guide slot formed in the camera body close to the front end thereof.

When the finder is erected or extended to a position ready for use, the slide 5 is in its pulled-out position shown schematically in FIG. 1, so that the front lens 3 of the finder is in proper position for use, the finder also having a suitable rear lens or eyepiece lens, not shown in this view. When the finder is not to be used, it is collapsed by shoving the slide 5 downwardly into the camera body so that the cover 7, preferably integrally connected with the slide 5 and extending rearwardly at the top edge thereof, comes down onto the wall 2 of the camera body and serves to cover the rear lens or eyepiece lens of the finder, which meanwhile has been folded down flat onto the wall of the body, either by a separate manual operation or preferably by the act of shoving the slide 5 and cover 7 downwardly, as further explained below in connection with FIG. 5.

The collapsed position or condition of the parts is indicated schematically in FIG. 2. If the slide 5 is placed at the extreme forward end of the camera, just behind the front wall of the camera body, and if the picture taking lens 6 is slightly recessed rearwardly, then the slide 5 in its collapsed position can preferably act as a guard or cover for the picture lens 6, coming down in front of this lens 6 when the slide is moved to the collapsed position.

Figure 3:
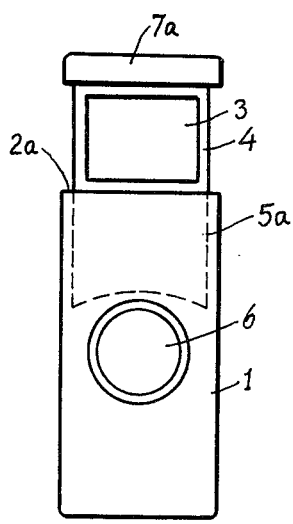
FIG. 3 is a schematic front face view of a different shape of camera equipped with a collapsible finder according to one form of the present invention, showing the finder in erect position for use.
Figure 4:
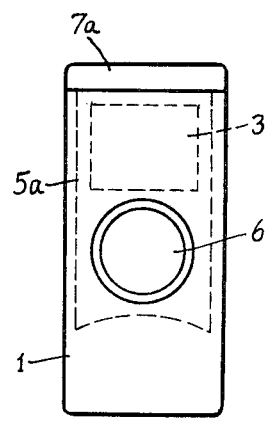
FIG. 4 is a view similar to FIG. 3, but showing the finder collapsed.

FIGS. 3 and 4 illustrate schematically the same arrangement as applied to a relatively narrow side wall of a camera body, rather than a relatively wide side wall. The camera body is again indicated at 1, and the relatively narrow wall on which the finder is mounted is shown at 2a. The front lens 3 of the finder and its frame 4 are mounted on the slide 5a which, like the previous slide 5, slides in a direction perpendicular to the axis of the picture taking lens 6, in a suitable slot or guideway close to the front of the camera. As before, the slide preferably comes down in front of the camera lens 6 when the finder is collapsed, to form a protective cover for the lens.

Because the finder is mounted on a relatively narrow wall of the camera body instead of a wide wall, it is now possible to make the cover 7a of the finder the same width as the wall of the camera body on which it is mounted, so that when the finder is collapsed, the cover 7a forms a smooth continuation of the contour of the camera, as well seen in FIG. 4.

Figure 5:
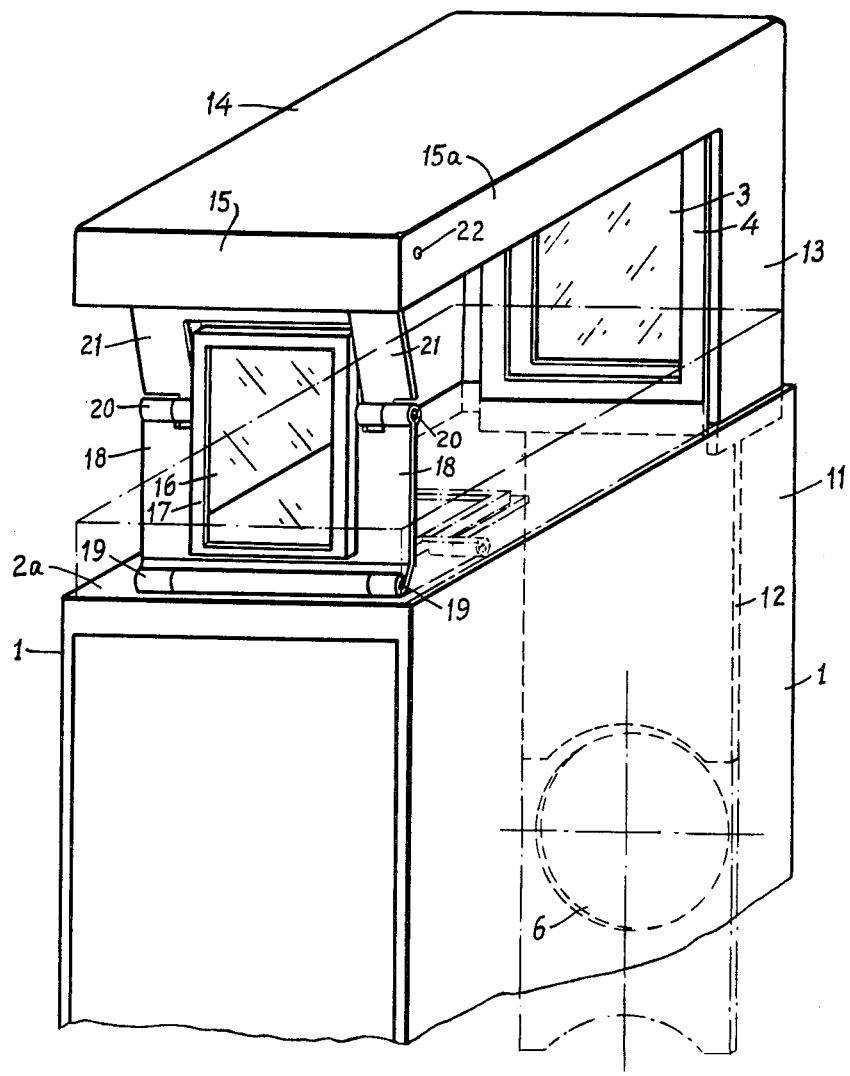
FIG. 5 is a perspective view taken obliquely from the rear, illustrating further details of the collapsible finder according to a preferred embodiment of the invention and applied to a camera of the general shape illustrated schematically in FIGS. 3 and 4.

Further details of a preferred embodiment of the invention are illustrated in FIG. 5, in which the camera body is again indicated at 1, and the narrow side wall on which the finder is mounted is again indicated at 2a. The front lens 3 of the finder is here shown as being in a frame 4 which is connected, preferably rigidly, to the slide 12 which is in a plane perpendicular to the optical axis of the picture taking lens 6, and which is movable in a guide slot perpendicular to such axis, in the front portion 11 of the camera body. The lens frame 4 is preferably rigidly connected to an angular or L-shaped cover member having a vertical front portion 13 and a horizontal rearward extension or top portion 14 as shown, the cover having shallow downwardly extending flanges 15 at the rear and 15a at the sides.

The rear lens or eyepiece lens 16 of the finder is mounted in a frame 17 which, in turn, is mounted on hinged struts or links connecting the rear portion of the top wall 2a of the camera body to the rear portion of the cover 14, in such fashion that when the cover is collapsed downwardly, the struts will fold and cause the rear lens 16 to lie down approximately flat on the top wall of the camera body. Thus the rear lens mount 17 is preferably rigidly secured to the two struts 18, one on each side of the lens mount, each of these struts 18 being hinged on a lower hinge 19 to the camera body wall 2a near the rear edge thereof, and being hinged at its upper end on a hinge 20 to a second set of struts 21 which are hinged at their upper ends at 22 to the cover member 14 near the rear end thereof.

Preferably the parts are so proportioned and arranged that when the finder is in its erected position, the hinges 19, 20, and 22 do not lie in a straight line with each other, but the hinge 20 is slightly forwardly of a line connecting the hinges 19 and 22, so that the hinges do not reach a "dead center" position when the finder is fully erected ready for use. Thus, in this preferred construction, a simple downward pressure on the cover 14 will cause the rear lens frame to fold automatically without the need for a separate manual folding operation. As the front lens 3 and its associated frame and slide parts 4, 12, 13 slide downwardly into their slots in the front portion of the camera body, the downward pressure on the cover 14 causes the struts 21 to exert downward pressure on the hinges 20, with the result that the struts 18 swing downwardly and forwardly, carrying the rear lens 16 in its frame 17 downwardly and forwardly with the struts, to the broken line position shown in FIG. 5. Thus these parts are caused to lie substantially flat against the wall of the camera body, while the struts 21 swing upwardly and forwardly relative to the cover 14, as the cover moves downwardly. In the completely collapsed position of the cover, illustrated in broken lines in FIG. 5, it is seen that the rear flange 15 and side flanges 15a of the cover come down around the collapsed parts of the rear lens of the finder, covering and protecting such parts and providing an almost smooth external contour for the camera.

When it is desired to take a picture, the side flanges 15a of the cover can be grasped between the thumb and a finger of the operator and gently pulled upwardly. This will automatically swing the rear lens 16 up to its proper operative position, and of course the front lens 3 simultaneously comes up by a straight motion of translation (without any swinging) to its operative position, so that the finder is now ready for use.

With such an arrangement, the axial distance from the front finder lens 3 to the rear finder lens 16 is preferably slightly less than the axial length of the camera body, and the cover 14 is preferably of the same length as the camera body, so that when it is in its collapsed position, the front and rear flanges of the cover form continuations of the front and rear walls of the body, without detracting in any way from the smooth contour. Because of the way in which the rear lens folds down flat onto the corresponding side wall of the body, the flanges 15 and 15a do not need to be deep but can be quite shallow, so that the extra height added to the camera when the finder is collapsed, is rather inconsiderable. Just as previously explained in connection with FIGS. 1–4, the slide portion 12 preferably comes down in front of the lens 6 when the finder is collapsed, to provide a protecting cover for the picture-taking lens.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body and a direct vision viewfinder of the Newton type having a front lens mount and a rear eyepiece lens mount, characterized by the fact that the front lens mount is mounted on said camera body for movement of translation parallel to itself from an operative viewfinding position projecting from said body to a collapsed position substantially enclosed within said body, and that the rear lens mount is hinged to said body for swinging movement from an erect operative viewfinding position to a collapsed position folded substantially against said body, and further characterized by means operatively connecting said front lens mount to said rear lens mount to cause swinging of said rear mount on its hinge by said movement of translation of said front mount.

2. A construction as defined in claim 1, further including a cover member attached to and moving with said front mount and positioned to overlie said rear mount in covering relation thereto when said rear mount and said front mount are in their respective collapsed positions.

3. A construction as defined in claim 2, in which said cover is of approximately the same area as the wall of the camera body on which said rear lens mount is mounted, so that the edges of said cover lie approximately flush with the edges of said wall of the camera body when said cover is in collapsed position.

4. A construction as defined in claim 1, further including a picture-taking lens mounted in said body, and a slide member extending in a direction substantially perpendicular to the axis of said picture-taking lens, said front lens mount of the viewfinder being mounted on said slide member and movable bodily therewith, said slide member being in covering relation to said picture-taking lens when said front lens mount is in its collapsed position.

5. A photographic camera comprising a camera body and a direct vision viewfinder of the Newton type having a front lens mount and a rear eyepiece lens mount, characterized by the fact that the front lens mount is mounted on said camera body for movement of translation parallel to itself from an operative viewfinding position projecting from said body to a collapsed position substantially enclosed within said body, and that the rear lens mount is hinged to said body for swinging movement from an erect operative viewfinding position to a collapsed position folded substantially against said body, further including a cover member attached to and moving with said front mount and extending rearwardly therefrom to a position overlying said rear mount when both of said mounts are in their respective operating positions, and a link pivotally connected both to said rear mount and to said cover to cause said rear mount to swing downwardly to its collapsed position by the act of moving said cover and front mount toward their collapsed positions.

6. A photographic camera comprising a camera body and a direct vision viewfinder of the Newton type having a front lens mount and a rear eyepiece lens mount, characterized by the fact that the front lens mount is mounted on said camera body for sliding movement from an operative erect viewfinding position projecting from a side wall of said body to a collapsed position in substantially non-erect relation to said side wall, and that said rear lens mount has a portion pivotally mounted on said body for swinging movement from an operative erect viewfinding position projecting from said side wall to a collapsed position in substantially non-erect relation to said side wall, further including a cover member rigidly connected to said front lens mount and pivotally connected to said rear lens mount for covering both of said mounts when both of them are in their respective collapsed positions, said cover member being of approximately of the same outline and area as said side wall of the camera body so that when the parts are collapsed, the cover member has edges approximately flush with other walls of the camera body adjacent to the side wall on which the viewfinder is located.

7. A photographic camera comprising a camera body and a direct vision viewfinder of the Newton type having a front lens mount and a rear eyepiece lens mount, characterized by the fact that the front lens mount is mounted on said camera body for movement from an operative erect viewfinding position projecting from a side wall of said body to a collapsed position in substantially non-erect relation to said side wall, and that said rear lens mount is also mounted on said body for movement from an operative erect viewfinding position projecting from said side wall to a collapsed position in substantially non-erect relation to said side wall, further including a cover member for covering both of said mounts when both of them are in their respective collapsed positions, said cover member being rigidly connected to one of the lens mounts of the viewfinder to move bodily therewith and being pivotally connected to the other of said lens mounts.

References Cited in the file of this patent

UNITED STATES PATENTS

| | | |
|---|---|---|
| 2,390,932 | Fitz | Dec. 11, 1945 |
| 2,521,743 | Perlin | Sept. 12, 1950 |
| 2,751,825 | Fried | June 26, 1956 |